United States Patent [19]

Satterwhite et al.

[11] Patent Number: 5,365,163
[45] Date of Patent: Nov. 15, 1994

[54] SENSOR ARRAY FOR CIRCUIT TRACER

[75] Inventors: James R. Satterwhite, Roxboro, N.C.; Sandra J. Horning, Austin, Tex.; Gerald A. Wyatt, Round Rock, Tex.; Daniel E. Reisem, Austin, Tex.

[73] Assignee: Minnesota Mining and Manufacturing, St. Paul, Minn.

[21] Appl. No.: 950,157

[22] Filed: Sep. 29, 1992

[51] Int. Cl.$^5$ ............ G01R 19/00; G01V 3/08; G01V 3/10; G01N 31/02
[52] U.S. Cl. .................. 324/67; 324/95; 324/109; 324/530
[58] Field of Search ............ 324/95, 72, 457, 530, 324/109, 133, 66, 67, 329

[56] References Cited

U.S. PATENT DOCUMENTS

| | | | |
|---|---|---|---|
| 3,729,675 | 4/1973 | Vosteen | 324/72 |
| 3,860,866 | 1/1975 | Dornberger et al. | 324/52 |
| 4,119,908 | 10/1978 | Cosman et al. | 324/3 |
| 4,134,061 | 1/1979 | Gudgel | 324/54 |
| 4,220,913 | 9/1980 | Howell et al. | 324/52 |
| 4,277,744 | 7/1981 | Audone et al. | 324/72 |
| 4,295,095 | 10/1981 | Thomas et al. | 324/326 |
| 4,318,042 | 3/1982 | Eda et al. | 324/457 |
| 4,387,340 | 6/1983 | Peterman et al. | 324/326 |
| 4,390,836 | 6/1983 | Bruce et al. | 324/54 |
| 4,427,942 | 1/1984 | Sole | 324/326 |
| 4,438,389 | 3/1984 | De Sa | 324/52 |
| 4,520,317 | 5/1985 | Peterman | 324/326 |
| 4,542,334 | 9/1985 | Nelson | 324/61 R |
| 4,542,344 | 9/1985 | Darilek et al. | 324/326 |
| 4,639,674 | 1/1987 | Rippingale | 324/326 |
| 4,665,369 | 5/1987 | Faller et al. | 324/326 |
| 4,672,321 | 6/1987 | Howell | 324/326 |
| 4,686,454 | 8/1987 | Pecukonis | 324/67 |
| 4,767,237 | 8/1988 | Cosman et al. | 405/157 |
| 4,843,324 | 6/1989 | Humphreys et al. | 324/326 |
| 4,942,365 | 7/1990 | Satterwhite | 328/134 |
| 5,093,622 | 3/1992 | Balkman | 324/326 |
| 5,166,679 | 11/1992 | Vranish et al. | 340/870.3 |
| 5,231,346 | 7/1993 | Gassmann | 324/95 |

FOREIGN PATENT DOCUMENTS

90/00746  11/1990  WIPO ............ G01V 3/08

OTHER PUBLICATIONS

3M Brochure on Scotchtrak ™ Circuit Tracers. Copyright 1990.

Primary Examiner—Walter E. Snow
Attorney, Agent, or Firm—Gary L. Griswold; Walter N. Kirn; Jack V. Musgrove

[57] ABSTRACT

A circuit tracer for determinating the location of a conductor, such as a wire, which is either an open or closed circuit, and which may lie underground. The tracer includes a transmitter which is connected to the conductor, a hand-held probe, and a receiver which is connected to the probe. The probe has three different sensors: an electric field sensor, primarily for locating the terminus of an open-ended conductor or for distinguishing such a wire in a bundled cable of wires; a differential electric field sensor, for determining the direction to and location of an open-ended conductor located above ground; and an inductive sensor for determining the direction to and location of a current-carrying conductor, including an open-ended conductor lying below ground. A switch selectively provides the output from one of the sensors to the receiver unit, which determines the magnitude of any signal based upon the direction the probe is pointing. By swinging the probe back and forth, and observing the received signal, the direction to and location of the conductor may be determined.

11 Claims, 7 Drawing Sheets

SENSOR ARRAY FOR CIRCUIT TRACER

BACKGROUND OF THE INVENTION

1. Field of the Invention

The present invention generally relates to electronic detection devices, and more particularly to an apparatus for tracing and locating an open-ended conductor or a conductor forming a closed circuit, a portion of which may lie above ground and a portion of which may lie below the ground.

2. Description of the Prior Art

The art is replete with techniques and devices for determining the direction to and location of a cable, such as an insulated, current-carrying conductor. Most of these techniques involve the use of one or more inductive sensors, such as a coil or a coil with a high-permeability core, which picks up the electromagnetic signal created by an alternating current in the conductor. See, e.g., U.S. Pat. Nos. 4,119,908; 4,134,061; 4,220,913; 4,295,095; 4,387,340; 4,427,942; 4,438,389; 4,390,836; 4,520,317; 4,542,344; 4,639,674; 4,665,369; 4,672,321; 4,767,237; 4,843,324; and 5,093,622. The general direction to the conductor is indicated when a peak or null signal is detected by the inductor, depending upon its orientation; a tangential orientation gives a peak signal and a normal orientation gives a null signal. A similar technique is used in many devices sold by Minnesota Mining and Manufacturing Company (3M—assignee of the present invention), such as the SCOTCHTRAK TK 3B/6B circuit tracers. Other measurement techniques may also be used under certain circumstances. For example, in U.S. Pat. No. 4,542,334, two electrodes are used to steer a device which buries an undersea cable. The electrodes are located on either side of the cable, and capacitively couple a signal to the cable, which is then detected and is used to provide left/right guidance. The sensing of an alternating current may further be enhanced by certain signal processing methods, such as that disclosed in U.S. Pat. No. 4,942,365.

While the tracing of current-carrying conductors is thus easily accomplished, this is not the case for conductors which have a break, i.e., are open-ended. In such a conductor, since there is no closed electrical path, very little current can be established in the conductor (at least when the conductor has negligible capacitive coupling to the surrounding medium), and so typical current-sensing inductors are relatively useless in the attempted location of such a conductor. It has also not been feasible to use the guidance technique of the '334 patent since that technique presumes that the approximate location of the cable is known, the receiving coupler is placed about the cable, and the cable is located between or very near the source electrodes. When the cable is not so located in the immediate vicinity of the electrodes, the signal coupled to the cable from the electrodes is too weak to be successfully processed to provide a left/right signal.

One device which has partially overcome these problems is described in U.S. Pat. No. 4,686,454. That device uses both inductive sensors and a capacitive sensor; the capacitive sensor is not differential, although it is somewhat directional since it uses an electric field sensing "guarded" electrode. A guarded electrode is simply one in which the sensing element is shielded in certain directions by another metallic plate, which is excited by a potential similar to the electrode potential to eliminate "fringing" flux. The metallic plate acts as a driven shield since a feedback arrangement is used to supply the amplified output signal from the sensing element to the metallic plate. This device, however, suffers from the further requirement that the signal from the capacitive sensor must be added to the signals from the inductive sensors in order to provide reliable conductor location. This limitation is primarily due to the inability of the single capacitive sensor to accurately determine the precise direction associated with the maximum received signal, and thus the signals from the inductive sensors are needed to provide further orientation. Otherwise, reliance on the capacitive sensor signal alone would easily lead to an erroneous determination of the conductor location. Furthermore, the combination of the two signals often creates output results which are confusing. It would, therefore, be desirable and advantageous to devise an instrument which overcomes the foregoing limitations, by providing means for detecting an open-ended conductor which combines the benefits of a directional sensor with a differential sensor. The instrument should further have a magnetic sensor to enable it to trace the conductor when for various reasons the electric field sensors are shielded from the conductor.

SUMMARY OF THE INVENTION

The present invention provides an improved circuit tracer generally comprising (i) a transmitter which applies a test signal of alternating voltage to energize the conductor, (ii) a probe which senses the time-varying electric field potential surrounding the energized conductor or, alternatively, which detects the electromagnetic field when sufficient current can be established in the conductor, and (iii) a receiver which processes the signals from the probe to provide a visual and/or audio indication of relative signal strength which is indicative of the conductor location.

The probe preferably includes three sensors, an electric field sensor, a differential electric field sensor, and an inductive sensor, which are exclusively selectable by a switch on the probe handle. The electric field sensor, which preferably takes the form of a guarded electrode, is first used to find the general direction to and location of the conductor. The differential sensor, which takes the form of two generally oppositely facing electrodes, is then used to provide greater resolution in conductor location. The electric field sensors are generally used when the conductor is above ground, where the varying electric field is easily detected. If tracing of the conductor leads to an underground path, the probe may be switched to the inductive sensor, which takes the form of an induction coil. When the portion of the conductor being traced is underground, there is much greater capacitive coupling between the ground and the conductor than when the conductor is above ground. Therefore, even if the conductor is open-ended, this effect allows a small, but sufficient, current to be carried on the conductor which is detectable by the sensitive inductive sensor.

The guarded electrodes are provided in a novel construction wherein a rear metallic shield is provided on one surface of a printed circuit board, with the sensing element on the opposite surface, and a ring shield surrounding the sensing element on the same surface. The shields are driven by providing a feedback circuit to supply the output of each sensing element to its shield. All three sensors are conveniently packaged in the head of a probe housing, the head forming an electrically shielded box which is electrically connected to the circuit ground. The induction coil is located at the center of the probe head, and the sensing element and rear shield of the electric field sensor, and the shielded box, have a plurality of slots therein to minimize the conductive areas normal to incoming magnetic flux and to reduce eddy currents, allowing the magnetic flux to enter into the probe head and be detected by the coil. High-gain, low-noise amplifiers are used to preserve the favorable signal-to-noise ratio obtained with the sensors. A level may also be provided on the handle portion of the probe, which is at an angle with respect to the main extension of the probe, to allow the operator to determine the depth of the conductor by a triangulation technique.

BRIEF DESCRIPTION OF THE DRAWINGS

The novel features and scope of the invention are set forth in the appended claims. The invention itself, however, will best be understood by reference to the accompanying drawings, wherein:

DESCRIPTION OF THE PREFERRED EMBODIMENT

Figure 1:
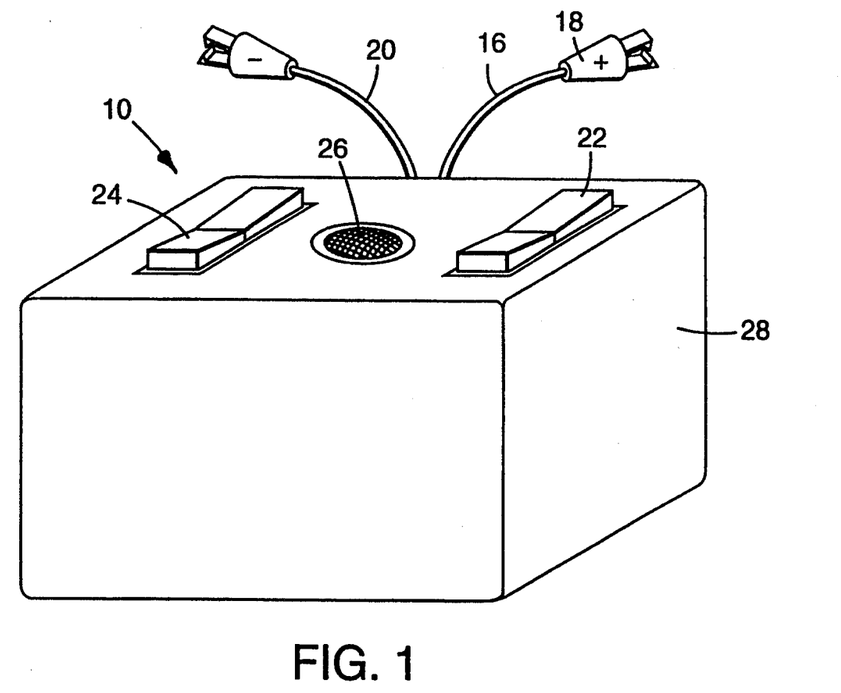
FIG. 1 is a perspective view of the transmitter unit of the circuit tracing system of the present invention.
Figure 2:
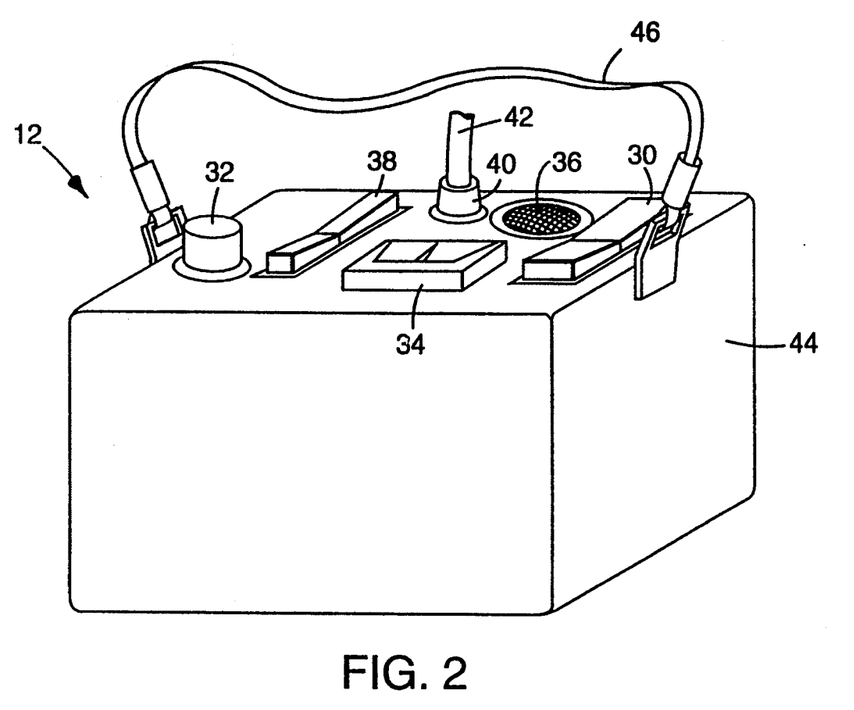
FIG. 2 is a perspective view of the receiver unit of the circuit tracing system of the present invention.
Figure 3:
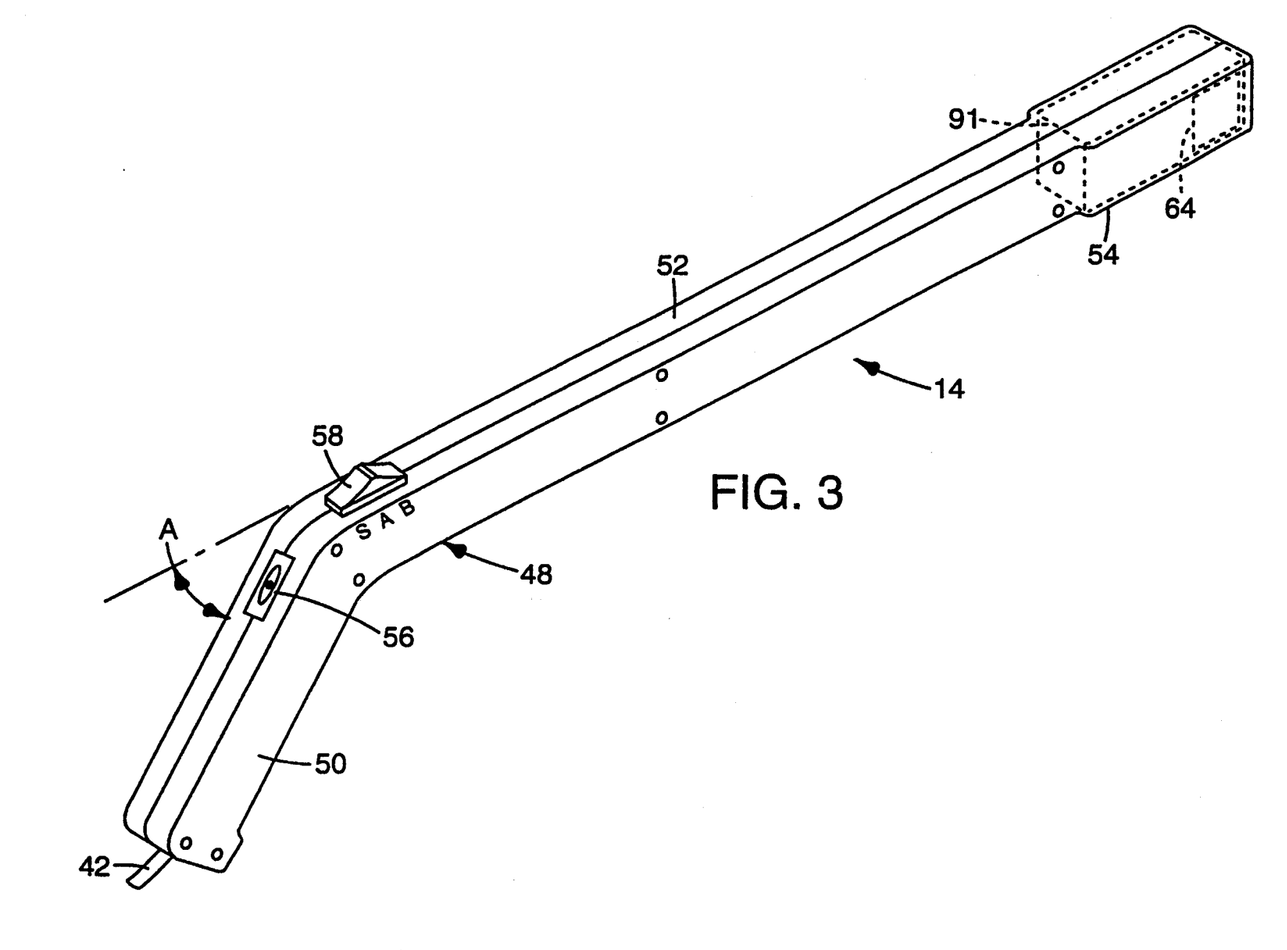
FIG. 3 is a perspective view of the probe unit of the circuit tracing system of the present invention.

With reference now to the Figures, and in particular with reference to FIGS. 1-3, there is depicted the circuit tracing system of the present invention, which is generally comprised of a transmitter unit 10 (FIG. 1), a receiver unit 12 (FIG. 2), and a probe unit 14 (FIG. 3). The circuit tracing system is particularly suited to locate electrical conductors (wires) having a break therein at an unknown location, i.e., open circuits, although it is equally useful with conductors in a closed-circuit, and operates whether the conductor is above or below ground. Transmitter unit 10 (discussed in greater detail below in conjunction with FIG. 6) provides a test signal which is applied to the conductor by means of a cable 16 having an appropriate connector 18. Transmitter unit 10 is also equipped with a second cable 20 to provide a ground reference. These cables and connectors may take on various physical embodiments depending upon the nature of the circuit to be tested. For example, if the wire to be traced were connected to a standard electrical wall outlet, cables 16 and 20 could be combined into a single cord having a compatible standard plug. Transmitter unit 10 also has an on/off switch 22, a gain control switch 24; it may further have a speaker or sounder 26 for indicating the power (on/off) status or battery condition. The components of transmitter unit 10 are all contained in a housing 28.

Receiver unit 12 similarly includes an on/off switch 30, a gain control knob 32, and a readout dial or meter 34 for displaying the amplitude of the received signal. A speaker 36 is also provided so the operator can hear the relative strength of the received signal, and another switch 38 is provided to change the output of receiver unit 12 from a compressed logarithmic scale to an expanded logarithmic scale. A connector port 40 receives the cable 42 from probe unit 14. The components of receiver unit 12 are contained in a housing 44, which has attached thereto a shoulder strap 46.

Probe unit 14 is constructed of a housing 48 having a handle or grip portion 50, an arm or extension portion 52, and a head or end portion 54. Housings 28, 44 and 48 are all ideally water resistant, and constructed of any durable material, preferably a polymer such as high-density polyethylene (HPDE), acrylonitrile butadiene styrene (ABS), or polystyrene (PS). The overall length of housing 48 is preferably about 66 cm. Handle 50 has an appropriate size and shape to allow the operator to grasp probe unit 14. Proximate handle 50 are a level vial 56 (a liquid-filled tube containing an air bubble), and a switch 58. Level 56 allows the operator to determine the depth of a buried cable using triangulation, as further explained below. Switch 58 allows the operator to choose one of three sensors in location and tracing of the conductor, as explained further below.

Figure 4:
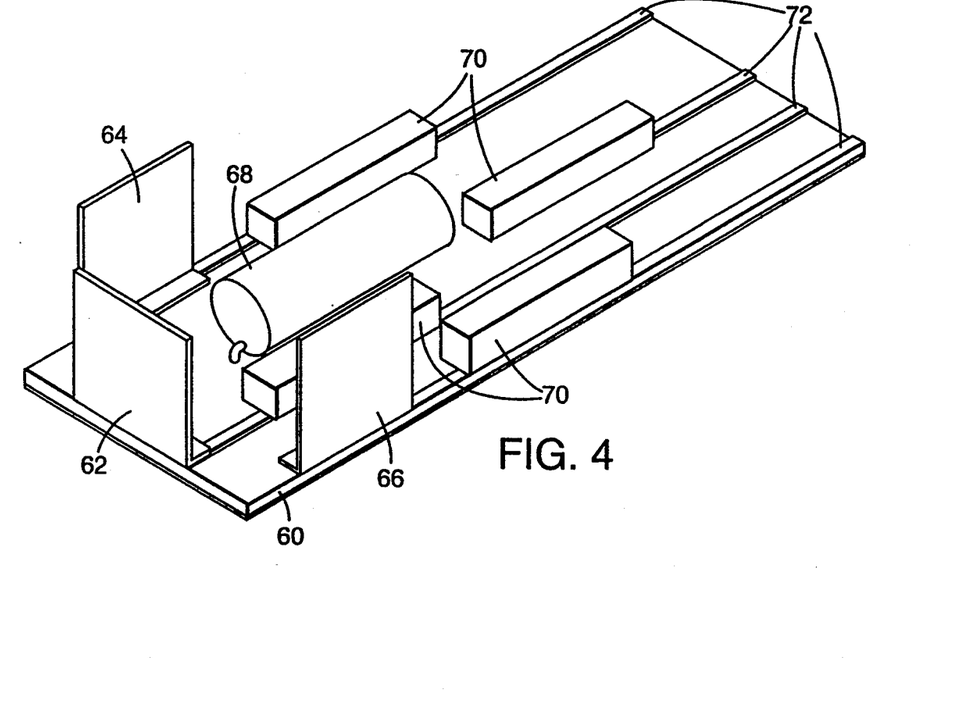
FIG. 4 is a perspective view of the probe electronics, including the sensor array.

Probe head 54 contains the novel sensor array shown in FIG. 4. Three sensors are provided on the printed circuit board (PCB) 60: a single-ended electric field sensor comprising a first guarded electrode 62, located at the front end of head 54; a differential electric field sensor comprising second and third guarded electrodes 64 and 66, located at the sides of head 54 and generally parallel to one another; and an inductive sensor comprising an induction coil 68 located between electrodes 64 and 66, with its axis perpendicular to the face of electrode 62, i.e., in alignment with arm 52. Coil 68 is constructed with a high initial permeability, low retentivity core, and has a high Q to produce the best possible signal-to-noise ratio. Preamplifiers 70 are provided for each of the electrodes 62, 64 and 66 and coil 68. The leads 72 from preamplifiers 70 are connected to an analog switch. The analog switch is controlled by wires which traverse the length of arm 52 and are connected to the input contacts of switch 58. As explained further below, the analog switch is connected to a differential amplifier which in turn is connected to wires in cable 42 which exit handle 50.

Figure 5A:
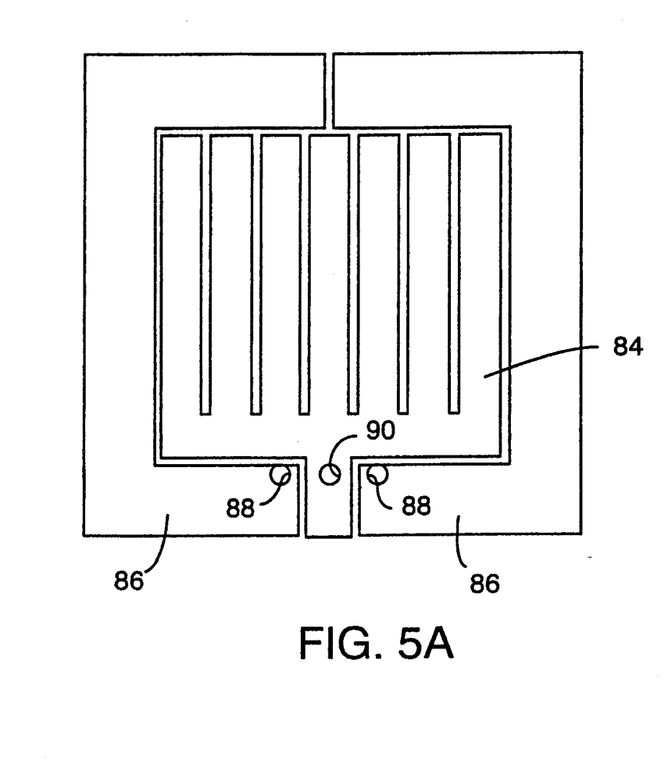
FIGS. 5A, 5B and 5C are front, side and rear elevational views, respectively, of the novel guarded electrodes used in the electric field and differential sensors of the probe electronics.
Figures 5B, 5C:
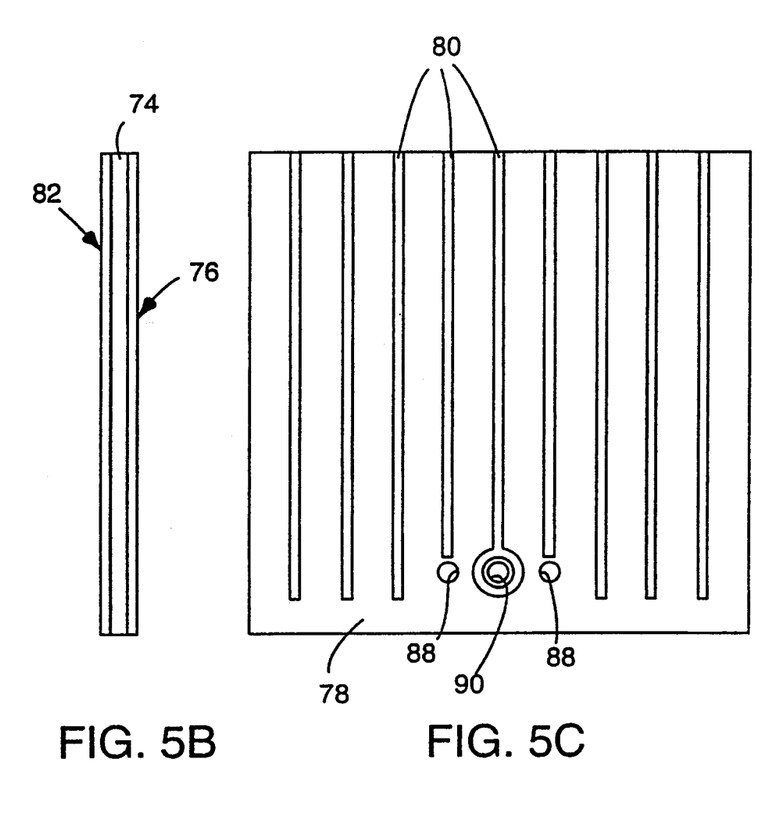

The construction of the guarded electrodes 62, 64 and 66 is shown in FIGS. 5A-5C. Each electrode has an electrically insulative substrate 74 which is preferably formed of the same material as a printed circuit board, i.e., an epoxy resin composite. The rear face 76 of the electrodes has a metallic shield 78 bonded to substrate 74; rear shield 78 has a plurality of slots 80 (preferably about 0.25 mm wide). The front face 82 of the electrodes has a metallic sensing element 84 with a plurality of similar slots, preferably parallel with slots 80, and a pair of metallic borders or strips 86 surrounding sensing element 84, forming an incomplete ring shield. Element 84 and strips 86 are also bonded directly to the surface of substrate 74. The preferred material for element 84 and ring and rear shields 86 and 78 is copper. Rear shield 78 has two copper-plated holes 88 therein which pass through substrate 74 to provide a lead for electrical conductivity with strips 86, and has another copper-plated hole 90 with an insulative border which passes through substrate 74 to provide a contact for sensing element 84. The resulting guarded electrodes are highly directional (i.e., in the direction generally perpendicular to the surface of sensing element 84). This characteristic is termed directional because the magnitudes of the potentials of the sensed equipotential electric field surfaces surrounding the energized conductor diminish with distance from the conductor. A differential electrical field potential sensor can only measure the difference in the potential of two equipotential surfaces. If the sensor is aligned such that the two sensing elements both lie in one equipotential surface, the detected difference is zero. If the sensor is aligned such that a line from one sensing element to the other is perpendicular to an intersecting equipotential surface, the detected difference is a maximum. Thus, as the differential sensor is rotated about any axis embedded in an equipotential surface, the detected difference will change from zero when the line between the two sensors is in the surface (or tangent to the surface), to the maximum when the line is perpendicular to the surface. In other words, the amplitude of the sensed electric field potential is dependent upon its angular location with respect to the normal of element 84. The novel use of such directional electrodes in a differential sensor has been shown to greatly improve the spatial resolution of probe unit 14, and eliminates any need for simultaneous sensing by, e.g., an inductive sensor.

The sensor array (i.e., the space defined by PCB 60 and the components thereon) is partially shielded by a metallic box-like screen 91 within probe head 54, the screen having cutouts corresponding to the location of electrodes 62, 64 and 66. Screen 91 is also provided with a longitudinal gap to prevent eddy currents, and is connected to the circuit ground. The slots in rear shield 78 and sensing element 84 allow the magnetic field lines generated by current in the conductor to penetrate head 54 to coil 68; slots need be provided only in the electric field sensor (electrode 62) for this purpose; however, for ease of manufacture, the same slotted design is used for all three of the electrodes 62, 64 and 66. The use of the guarded electrode array and screen 91 yields high resolution in the location process due to ease of precise alignment with the normal to the electric field equipotentials and due to the maximum decoupling obtained from earth ground.

Those skilled in the art will appreciate that the differential sensor would still function even if the electrodes were not guarded, although this would decrease their resolution. Also, it is not necessary for the electrodes 64 and 66 to be completely parallel with one another. For example, the differential sensor would still theoretically be able to provide a differential signal even if these two electrodes were coplanar. In other words, it is only necessary to position electrodes 64 and 66 at two minimally spaced apart locations in order that they be able to detect the different equipotential surfaces.

Figure 6:
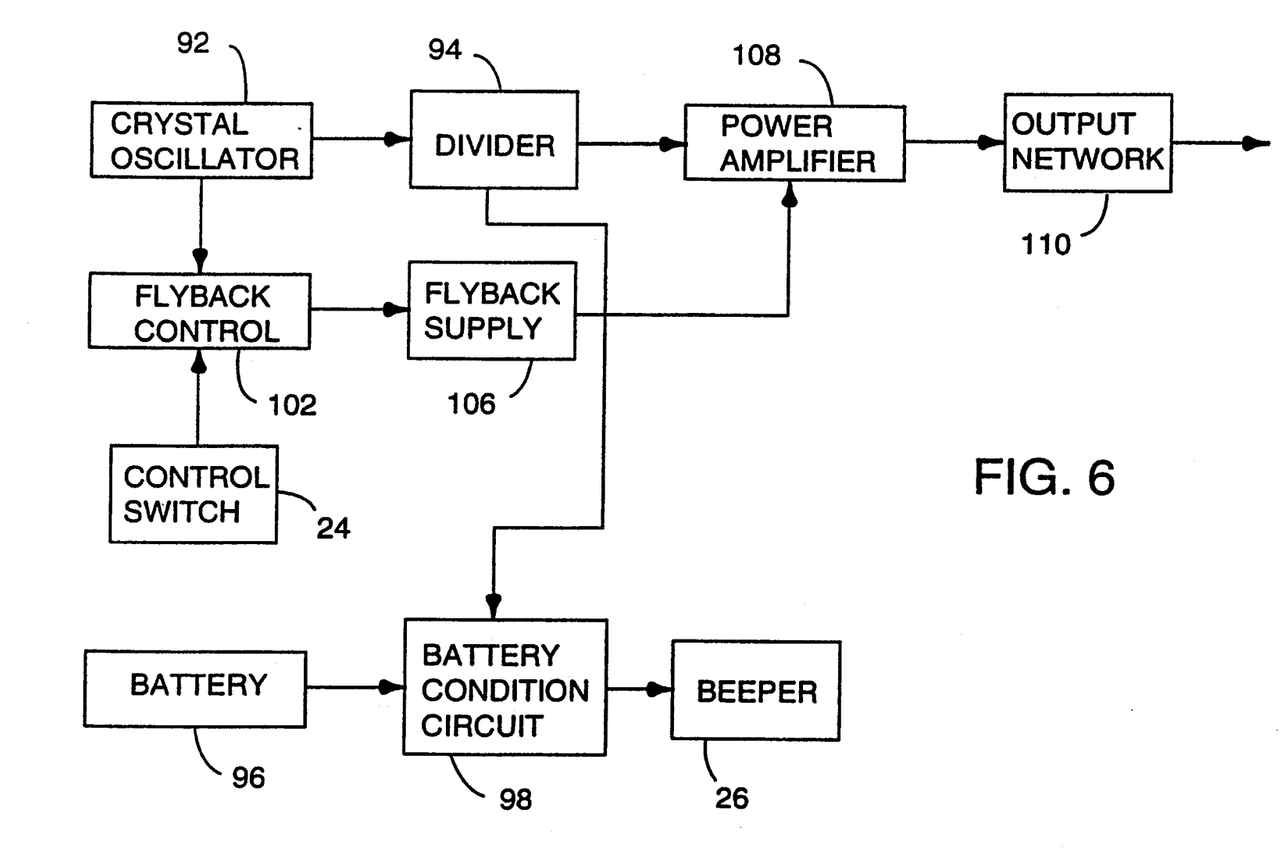
FIG. 6 is a block diagram of the transmitter electronics.

Referring now to FIGS. 6-9, the various electrical circuits in the circuit tracing system are now explained. A block diagram of the electronics of transmitter unit 10 is shown in FIG. 6. A crystal oscillator 92 and a divider 94 comprise the frequency source for the transmitter. The frequency of the test signal may vary widely but, in the disclosed embodiment, the transmitter frequency is in the range of 1 kHz to 300 kHz, preferably about 4-32 kHz, and most preferably about 16 kHz. The latter frequency is rarely used in other EM emission devices, and also balances the competing requirements for coupling between the signal radiating from the conductor and the electrodes when the electric field mode is used, versus current loading of the conductor when it is underground. A battery 96 may be supplied to provide power to unit 10, although an external power source could alternatively be used. It is understood that the various components of transmitter unit 10 are powered by battery 96 although the electrical connections between the battery and the components is omitted for clarity; similarly, all power supplied from battery 96 is controlled by on/off switch 22.

Divider 94 is connected, and provides audible tones, to a battery condition checking circuit 98; if circuit 98 detects low battery power, a sounder 26 is activated. The output of oscillator 92 is also directed to a flyback control circuit 102 which provides voltage conversion to maintain a specified maximum power output regardless of load on the circuit, and is controlled by gain control switch 24. Flyback control circuit 102 includes circuitry to limit the energy stored in a flyback transformer contained in flyback supply 106. The output of flyback control circuit 102 is directed to flyback supply 106 which converts battery energy to a voltage for the output power amplifier 108 such that the power from flyback supply 106 does not exceed an amount selected by control switch 24. The regulated signal is sent to an amplifier 108, and then to the output network 110 which is connected to cables 16 and 20. Output network 110 includes inductive and capacitive resonant circuits to effectively couple to a wide range of resistive, inductive, and capacitive loads, while reducing the harmonic content of the output signal. The transmitter output is thereby operable for impedances of 1 mΩ to 1 MΩ or more. The amplitude of the test signal is preferably no more than 50 volts for personnel safety and battery economy.

Figure 7:
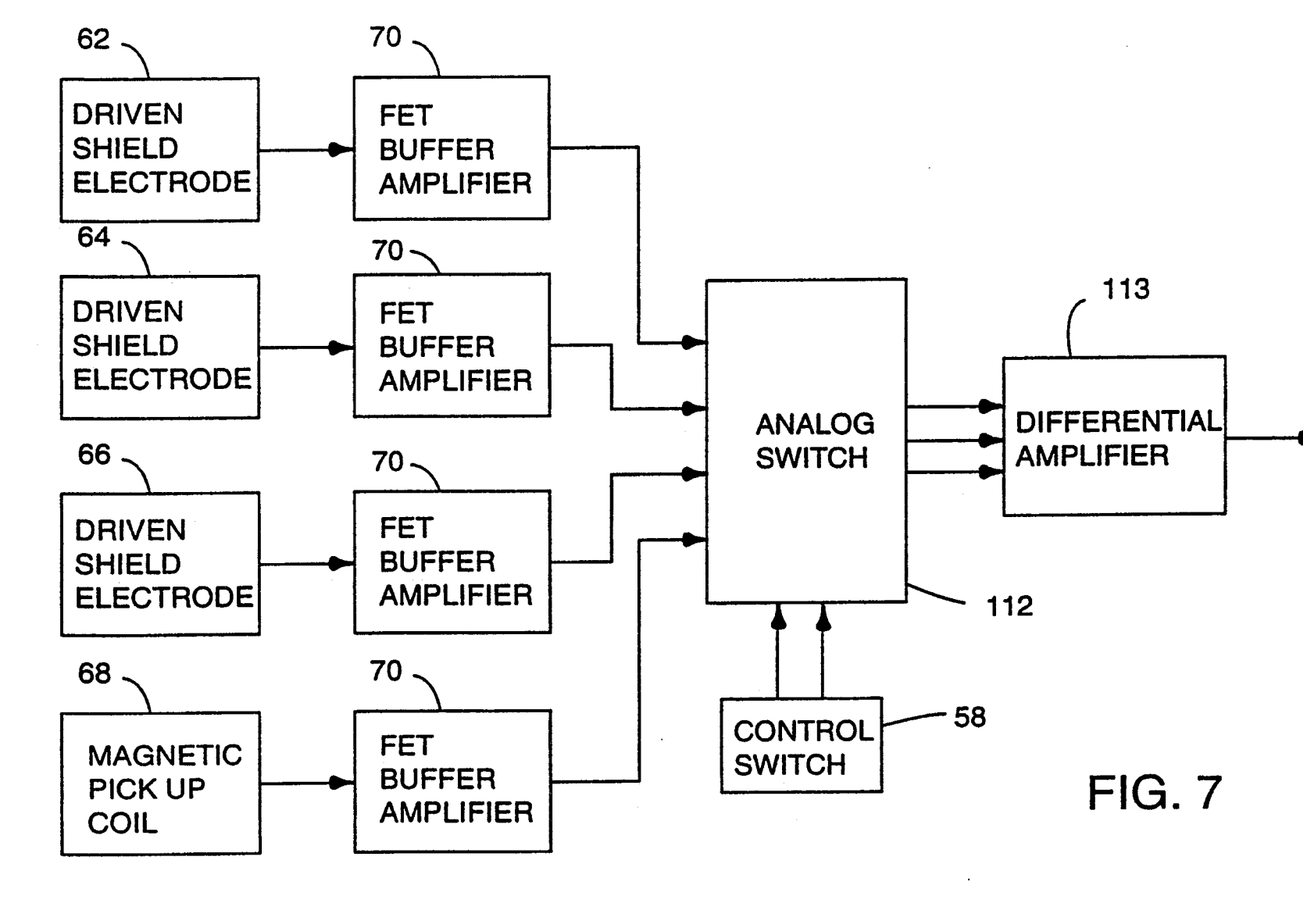
FIG. 7 is a block diagram of the probe electronics.

A block diagram of the electronics of probe unit 14 is shown in FIG. 7. As mentioned above, each of the electrodes 62-66 and coil 68 is connected to one of the preamplifiers 70 which, in the preferred embodiment, are junction field-effect transistor (JFET) buffer amplifiers. The outputs of preamplifiers 70 are connected to an analog switch 112 which is controlled by mechanical switch 58 to selectively provide a single output based upon only one of the electric field sensor, the differential sensor, or the inductive sensor. Upon reference to the remainder of the specification, those skilled in the art will appreciate that the differential sensor and inductive sensor could be used simultaneously; in the preferred embodiment, however, they are not so used since, as those skilled in the art will further appreciate, there is no practical advantage and or synergistic effect to the combined use of the differential sensor and the inductive sensor and, indeed, use of switch 58 and analog switch 112 ensures that the connection to one of the sensors is completely broken before a connection is made to another sensor ("break before make"). Analog switch 112 is preferably the switch commonly known as number 4053B, and is sold by many companies, including Radio Corporation of America (RCA). The output from analog switch 112 is provided to a differential amplifier 113 which sends the signal to receiver unit 12 via cable 42. Power for the various components of probe unit 14 is supplied by the battery in receiver unit 12, via wires in cable 42.

Figure 8:
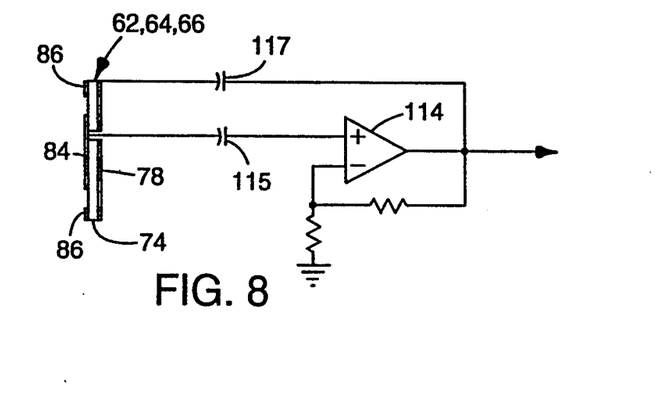
FIG. 8 is a schematic diagram illustrating the driven shield of the guarded electrodes used by the probe unit.

As further shown in FIG. 8, each of the electrodes 62, 64 and 66 have "driven" shields or guards. The output voltage from each electrode may be maximized by reducing the effective capacitance of the electrode with respect to ground. In the present invention, this is accomplished by energizing the ring and rear shields at a voltage which is equal to the voltage at the sensing element, forming the driven shield. The output of a non-inverting amplifier 114 is connected to strips 86 and rear shield 78, preventing coupling of sensing element 84 to ground through the regions occupied by either the ring shield or the narrow gap formed by substrate 74. In order to avoid a damaging discharge into FET amplifiers 70, capacitors 115 and 117 preferably has a capacitance in the range of 10–10,000 picofarads.

Introducing any conductive object near the energized conductor affects the shape of the equipotential electric field surfaces. It is thus desirable when measuring the electric field to disturb it as little as possible. The driven guarded electrode minimizes the introduction of such a disturbance since it aligns the potential of the guard to that of the sensing electrode and therefore close to the potential of the equipotential electric field surface in which it lies. The driven guarded electrode also allows the input impedance of the electrode to be higher than if it were not driven, resulting in less disturbance of the equipotential surface. For these reasons, a driven guarded electrode is superior to non-driven, guarded electrodes, yielding the greatest possible signal prior to amplification, and further eliminating sensing of any voltages from the circuitry in probe head 54. The use of high gain, low noise amplifiers 70, along with the driven shield on the guarded electrodes, greatly increases the sensitivity of the single-ended and differential sensors in tracing low-voltage or remote conductors.

Figure 9:
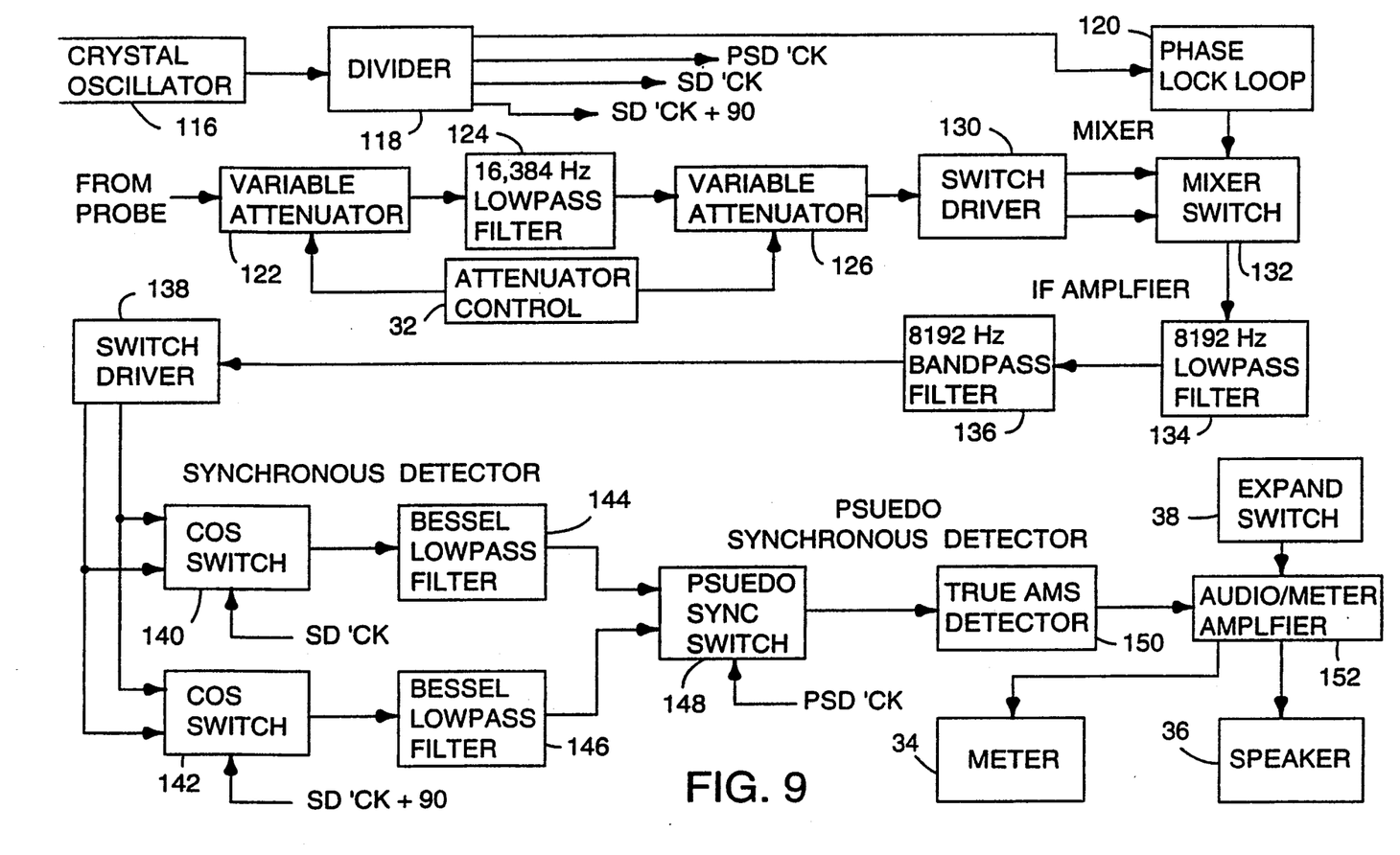
FIG. 9 is a block diagram of the receiver electronics.

A block diagram of the electronics of receiver unit 12 is shown in FIG. 9. Again, the battery connections are omitted for ease of viewing FIG. 9, but it is understood that a battery is supplied for receiver unit 12 in the same manner as shown for transmitter unit 10 in FIG. 6, including a battery condition checking circuit, and the battery of receiver unit 12 is controlled by switch 30. Another oscillator 116 and divider 118, tuned to the same frequency as transmitter unit 10, provide the frequency source for receiver 12. The output of divider 118 is directed to the detection circuits described below, and to a phase-lock-loop (PLL) frequency synthesizer 120. The signal from probe unit 14 passes through a first variable attenuator 122, a low pass filter 124, and a second variable attenuator 126. Both attenuators are regulated by gain control knob 32, and simply maintain the amplitude of the received signal in the range necessary to sufficiently observe the signal but also avoid applying an overvoltage to the remaining circuitry, i.e., when the received signal is very strong. The output of attenuator 126 is directed to a switch driver 130 which drives mixer switch 132, whose input is from PLL 120. The resulting output of mixer switch 132, an intermediate frequency (IF) signal, passes through another low pass filter 134 and a bandpass filter 136 which together comprise an IF amplifier.

The conditioned signal from bandpass filter 136 may be processed in many different ways to provide detection of the test signal from transmitter unit 10. In the preferred embodiment, receiver unit 12 performs the pseudo-synchronous detection routine as more fully described in U.S. Pat. No. 4,942,365, which determines the magnitude of the signals from the sensors. The sinusoidal signal from bandpass filter 136 is used as an input to another switch driver 138 which drives two synchronous detectors 140 and 142. Each of the synchronous detectors includes an inverter and an analog switch, the analog switch having two inputs, one being the unmodified signal from switch driver 138, and the other being the inverted form of that signal. In detector 140, the analog switch is responsive to the reference signal from divider 118; in detector 142, the analog switch is responsive to the reference signal from divider 118 with a 90° phase shift. The two signals from detectors 140 and 142 pass through Bessel low pass filters 144 and 146, respectively, and are then combined in a pseudosynchronous, or chopper analog, switch 148, which is also responsive to the reference signal from divider 118. The pseudo-synchronous signal is directed to an RMS detector 150, which passes the signal level to an amplifier 152. The output of amplifier 152 may be based on a compressed or expanded logarithmic scale depending upon the setting of switch 38. The output is directed to both meter 34 and speaker 36.

OPERATION

Operation of the circuit tracing system of the present invention begins by attaching the signal cable 20 of transmitter unit 10 to the accessible portion of the conductor, and attaching ground cable 18 to a local ground. Those skilled in the art will appreciate that the signal may be applied inductively if it is impossible or undesirable to directly (conductively) apply the signal. On/off switch 22 is turned on and, if the battery check is acceptable, gain control switch 24 is adjusted according to the particular conditions, i.e., "low" for short range tracing, "high" for long range. The voltage applied by the transmitter results in the alternate charging and discharging of the cable, creating a time-varying electric field potential which can be detected by electrodes 62, 64 and 66. Furthermore, if the conductor is part of a closed circuit, an alternating current will be established which creates an electromagnetic field detectable by the inductive sensor. Cable 42 of probe unit 14 is plugged into connector 40 of receiver unit 12, and on/off switch 30 is turned on. Again, assuming the battery checks out alright, gain control knob 32 is adjusted according to the conditions. If the general location of the conductor is known, switch 38 may be moved to the expanded logarithmic setting which gives the sharpest null and best resolution in location of a cable, but if the probe is being used at a location fairly distant from the transmitter and the location and depth of the cable are uncertain, then the operator may want to start with switch 38 at the compressed logarithmic setting to get a general feel for the direction of the conductor.

The operator may want to begin tracing with switch 58 of probe unit 14 in either the setting corresponding to the inductive sensor, or the setting corresponding to the single-ended sensor. Use of the single-ended sensor allows the user to confirm that the system is operating properly. This is accomplished by moving probe unit 14 close to, and pointing at, the transmitter lead 16; if a signal is not immediately detected, then the equipment should be checked for a possible malfunction. If the signal is detected, then the operator will move probe 14 to the general area where the conductor is to be located. The single-ended sensor is then used to find the general direction to and location of the conductor. Switch 58 may thereafter be set to either the differential sensor or the inductive sensor, depending upon the specific conditions.

Notwithstanding the foregoing, the inductive sensor may instead be used first if the conductor forms a closed-loop or immediately extends underground. Even if the conductor is open and above ground, if the starting location for tracing is relatively close to the transmitter, then the conductor may carry enough current for a short distance to allow tracing with the inductive sensor and, if so, this form of detection will be more accurate than the single-ended electric field sensing. Switch 58 may thereafter be moved to the differential sensor setting when the electromagnetic signal weakens. The single-ended electric field sensor (electrode 62) is normally used only to find one wire among a bundled cable of wires, or for pinpointing the terminus of an open-ended conductor.

Regardless of which sensor is used, location proceeds by following the path of the conductor while swinging the probe transversely to the conductor (i.e., left-right-left). Arm extension 52 of probe 14 should be held at an orientation generally perpendicular to the conductor. For example, if the conductor extends vertically in a wall, extension 52 should be horizontals but if the conductor travels horizontally underground, then extension 52 should be vertically pointed straight at the ground. During the swinging movement, when the probe is pointed directly towards the conductor, meter 34 and/or speaker 36 will provide an indication of alignment (i.e., a peak signal from the single-ended electric field sensor, or a null signal from the differential electric field or inductive sensors).

If the portion of the conductor being traced is underground, the surrounding conductive mass of the earth may limit the electric field to a region very close to the conductor, making detection by electric field sensors difficult or impossible. In such cases, however, the high capacitance of the conductor to earth allows a small current to flow even in an open conductor, and the electromagnetic field established thereby can be sensed by coil 68 (when oriented in the proper direction). There are cases where the electric field sensors are preferred for underground conductors. If the conductor is buried shallow or is in poorly conducting soil, the technique is viable, and can further aid in discriminating the paths of the desired conductor even when it is in the vicinity of other conductors. In such a case, the tracing signal may flow in the other conductors as well, and magnetic sensing cannot easily discriminate between these other conductors and the desired conductor, whereas the desired conductor can be adequately discriminated with the differential electric field sensor. Also, while the terminus of a buried open conductor can be determined using the inductive sensor, if the conditions are conducive to use of the electric field sensors, then the location of the terminus can be determined more precisely with the single-ended sensor.

If the conductor is underground, the operator may also want to know its depth. This may easily be determined by using level 56 in a well-known triangulation operation. Once the azimuthal location and direction of the conductor is known, a marker, such as a pin flag, may be placed on the ground. The operator then moves away from the marker, in a direction perpendicular to that of the conductor path, while maintaining the probe in an orientation wherein the bubble in the level remains between the two lines, i.e., with handle 50 at a horizontal pitch. As the operator moves away from the conductor, meter 34 will begin to drop off, establishing a null or reference point for triangulation at the location of the minimum signal. By measuring the distance from this reference point to the marker, and knowing the relative angle between handle 50 and extension 52, the operator may calculate the depth of the conductor. To simplify this procedure, however, handle 50 preferably extends at an angle A of 45° with respect to extension 52. In this manner, the triangle formed by the conductor, the marker, and the reference point is isosceles and, therefore, the depth of the conductor is approximately equal to the distance from the reference point to the marker. Thus, no calculation need be made other than measuring this distance.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

We claim:

1. A directional electrode comprising:
a generally planar, electrically insulative substrate having a first side and a second side;
a first metallic layer bonded to said first side of said substrate, said first metallic layer having a plurality of slots;
a second metallic layer bonded to said second side of said substrate, opposite said first metallic layer, said second metallic layer having a plurality of slots; and
a metallic border bonded to said second side of said substrate, at least partially surrounding said second metallic layer but spaced therefrom.

2. The electrode of claim 1 wherein:
said first metallic layer defines a first area; and
said second metallic layer defines a second area which is smaller than said first area.

3. The electrode of claim 1 wherein:
said substrate has first and second holes therein;
said first metallic layer has a first hole therein aligned with, and approximately the same size as, said first hole in said substrate, and further has a second hole aligned with, but larger than, said second hole in said substrate, providing an insulative border between said second hole in said first metallic layer and said second hole in said substrate;
said metallic border has a hole therein aligned with, and approximately the same size as, said first hole in said substrate; and
said second metallic layer has a hole therein aligned with, and approximately the same size as, said second hole in said substrate.

4. The electrode of claim 1 further comprising energizing means for supplying an output signal from said second metallic layer to said first metallic layer.

5. The electrode of claim 1 wherein said slots in said first metallic layer are generally parallel with said slots in said second metallic layer.

6. A sensor array for an electromagnetic probe, comprising:
a board member having an end and first and second sides;

first, generally planar, electrode means for sensing electric field potential, attached to said board member proximate said end thereof, extending generally perpendicular to said board member;

second and third, generally planar, electrode means for sensing electric field potential, attached to said board member proximate said first and second sides thereof, said second and third electrode means being generally parallel to one another, being generally perpendicular to said board member, and being generally perpendicular to said first electrode means; and inductive coil means attached to said board member, and interposed between said second and third electrode means, for sensing a magnetic field, said coil means having an axis which is generally perpendicular to said first electrode means and parallel to said second and third electrode means.

7. The sensor array of claim 6 wherein each of said first, second and third electrode means includes:
- a generally planar, electrically insulative substrate having a first side and a second side;
- a first metallic layer bonded to said first side of said substrate;
- a second metallic layer bonded to said second side of said substrate, opposite said first metallic layer; and
- a metallic boarder bonded to said second side of said substrate, at least partially surrounding said second metallic layer but spaced therefrom.

8. The sensor array of claim 6 further comprising a metallic screen member surrounding the sensor array, except for said first, second and third electrode means.

9. The sensor array of claim 7 wherein said second metallic layer of said second electrode means is on a side of said first metallic layer of said second electrode means opposite said third electrode means, and said second metallic layer of said third electrode means is on a side of said first metallic layer of said third electrode means opposite said second electrode means.

10. The sensor array of claim 8 wherein said first electrode means comprises:
- a generally planar, electrically insulative substrate having a first side and a second side;
- a first metallic layer bonded to said first side of said substrate, and having a plurality of slots therein;
- a second metallic layer bonded to said second side of said substrate, opposite said first metallic layer, and having a plurality of slots therein which are generally parallel with said slots in said first metallic layer; and 11. A circuit tracing system utilizing the sensor array of claim 8, and further comprising processing means for receiving output from the sensor array and for calculating a signal value based on said output, said processing means including a high-gain, low-noise amplifier having a reference input connected to said metallic screen member.

* * * * *